United States Patent [19]

Hunter

[11] 4,264,869
[45] Apr. 28, 1981

[54] COMPRESSED PULSE LASER

[76] Inventor: Robert O. Hunter, 1811 Verano Pl., Irvine, Calif. 92664

[21] Appl. No.: 960,393

[22] Filed: Nov. 13, 1978

[51] Int. Cl.³ ............................................. H01S 3/101
[52] U.S. Cl. .................................. 330/4.3; 331/94.5 T; 350/174
[58] Field of Search .................. 330/4.3; 350/169, 171, 350/174; 331/94.5 T

[56] References Cited

U.S. PATENT DOCUMENTS

| | | | |
|---|---|---|---|
| 3,443,243 | 5/1969 | Patel | 331/94 JC |
| 3,459,466 | 8/1969 | Giorgmaine | 331/DIG. |
| 3,922,618 | 11/1975 | Javan | 331/94.5 G |
| 3,986,130 | 10/1976 | Soures et al. | 330/4.3 |
| 4,019,151 | 4/1977 | Brueckner et al. | 331/94.5 R |
| 4,060,769 | 11/1977 | Mallozzi et al. | 350/171 |
| 4,073,572 | 2/1978 | Avicola | 350/174 |
| 4,093,924 | 6/1978 | Farcy | 331/94.5 C |
| 4,143,332 | 3/1979 | Michon et al. | 330/4.3 |
| 4,200,846 | 4/1980 | Stark et al. | 330/4.3 |

OTHER PUBLICATIONS

Ewing et al., "Optical Pulse Compressor Systems for Laser Fusion," 5/79, pp. 368–379, IEEE Jour. of Quant. Electronics, vol. QE-15, #5.
Stark, "Laser and Power Systems . . . Reactors," 5/9/78, 24 pages, Technology of Controlled Thermonuclear Fusion Meeting, LA-UR 781350.
Stark et al., "High Efficiency Laser Amplifier," 9/29/77, 13 pages, U.S. Pat. Appl. No. 838,011, NTIS, Abstracts also attached.
Ewing, "Pulse Compressor Sealing Issues . . . ," 9/19/78, PEW-15 EW-21, D.O.E. Schafer Assoc. Symp.

Primary Examiner—Nelson Moskowitz
Attorney, Agent, or Firm—Townsend and Townsend

[57] ABSTRACT

A long pulse laser amplifier is sequentially lased over a 0.5 microsecond period by an additive group of temporarily spaced discrete lasing colors (frequencies) each of slightly different color (approximately 1/10 of an Angstrom separation with less than 1/1000 angstrom band width). An oscillator array generates the actuating pulses which are channelled to common optical path, amplified by a factor of $10^4$ and split up and shaped before injection into approximately 10 final amplifiers. Each final amplifier is preceded by a chromatic deflector, preferably a diffraction grating so that each short pulse (in the order of about $10^{-8}$ seconds) is sent through the amplifier at slightly different directions. These differently directed pulses are amplified and individually address a mirror array placed at some distance away. Due to the narrow band width of each pulse, each address point is unique; there is no overlapping. As a result, the distance from each point on the mirror array may be to optically compensated for the difference in propagation time for each short pulse. By the expedient of sending the earlier pulses through longer paths and later pulses through shorter paths, a mirror array can reflect to a spot of extreme small dimension with simultaneity of all pulses and time of arrival. By sequentially timing the pulses through each amplifier, large amounts of energy can be delivered to a spot of small dimension with a much shorter pulse length than that of the laser amplifier. In addition, phasing locking the discrete amplifier outputs together, large apparent apertures can be generated for either small target size or long path lengths. Phase locking can occur within given colors or all colors. By utilizing an array of final amplifiers, each amplifier having an array of separately addressed mirrors, the disclosed system in effect stores light energy in transit and permits an arbitrary energy level to the impinge on such a small target.

20 Claims, 22 Drawing Figures

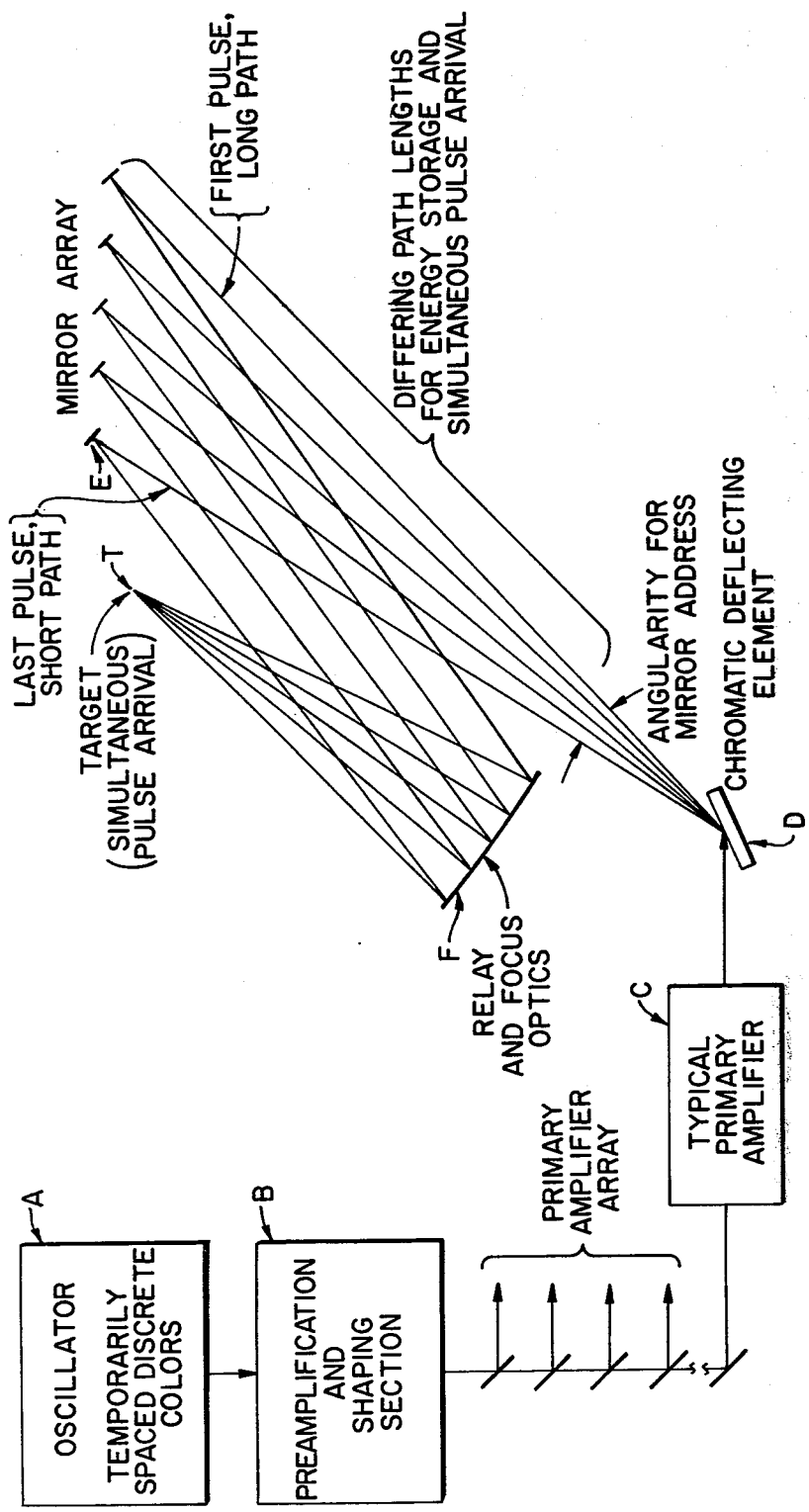
FIG._1.

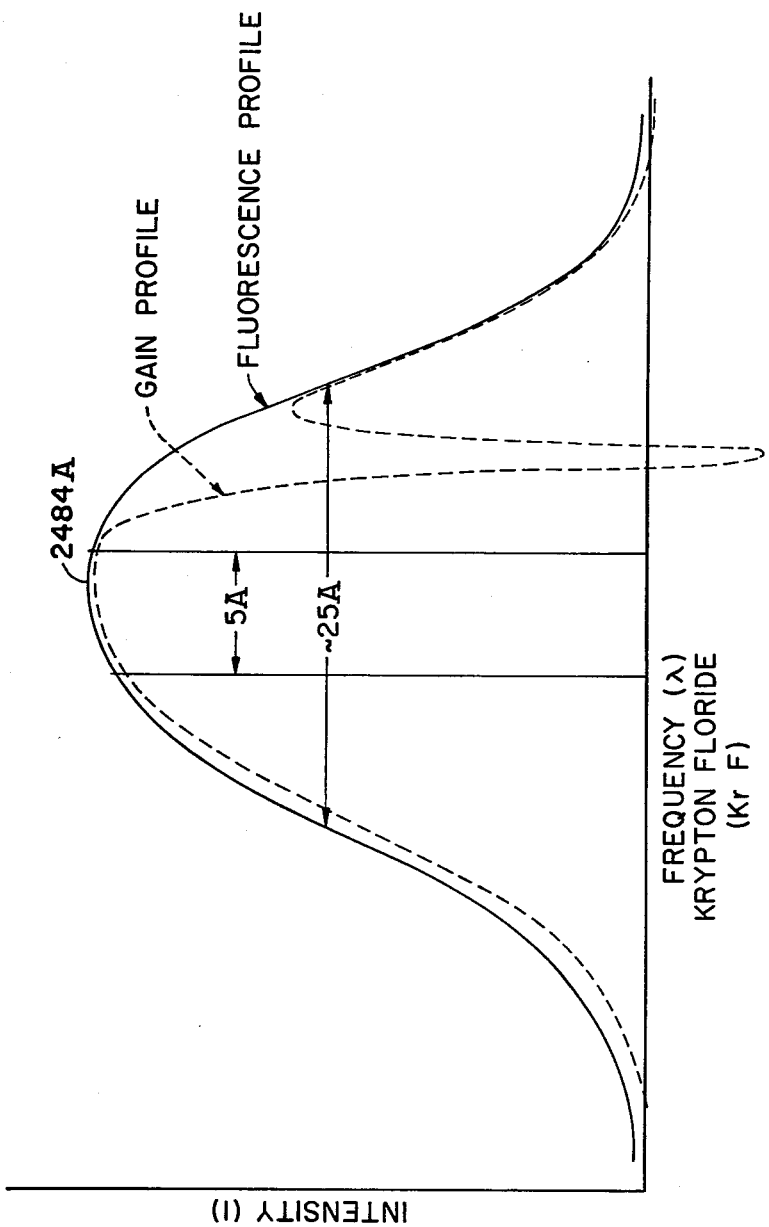
FIG._2.

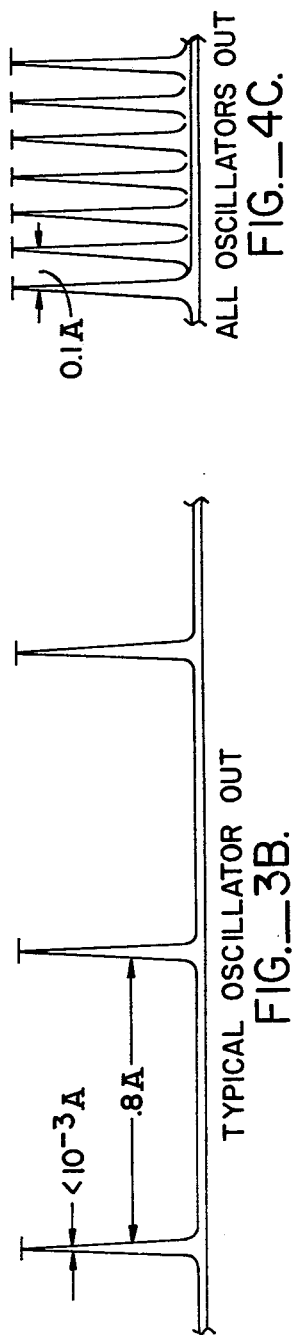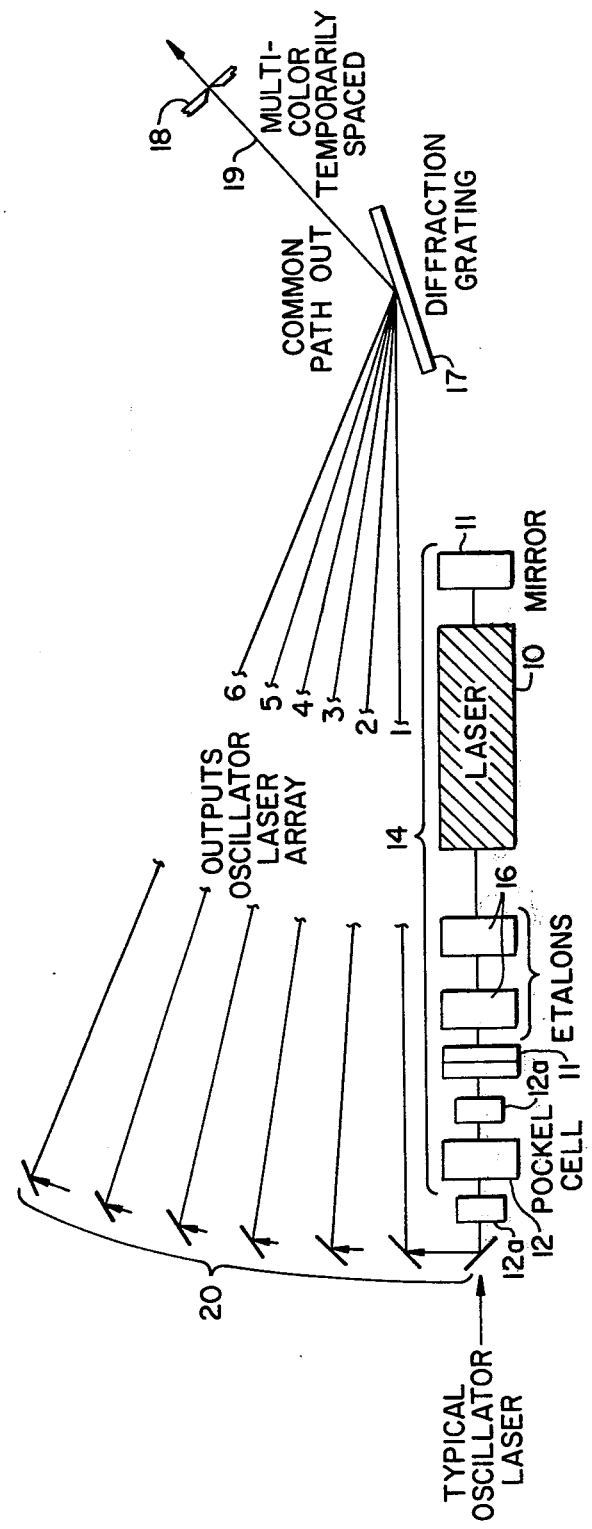

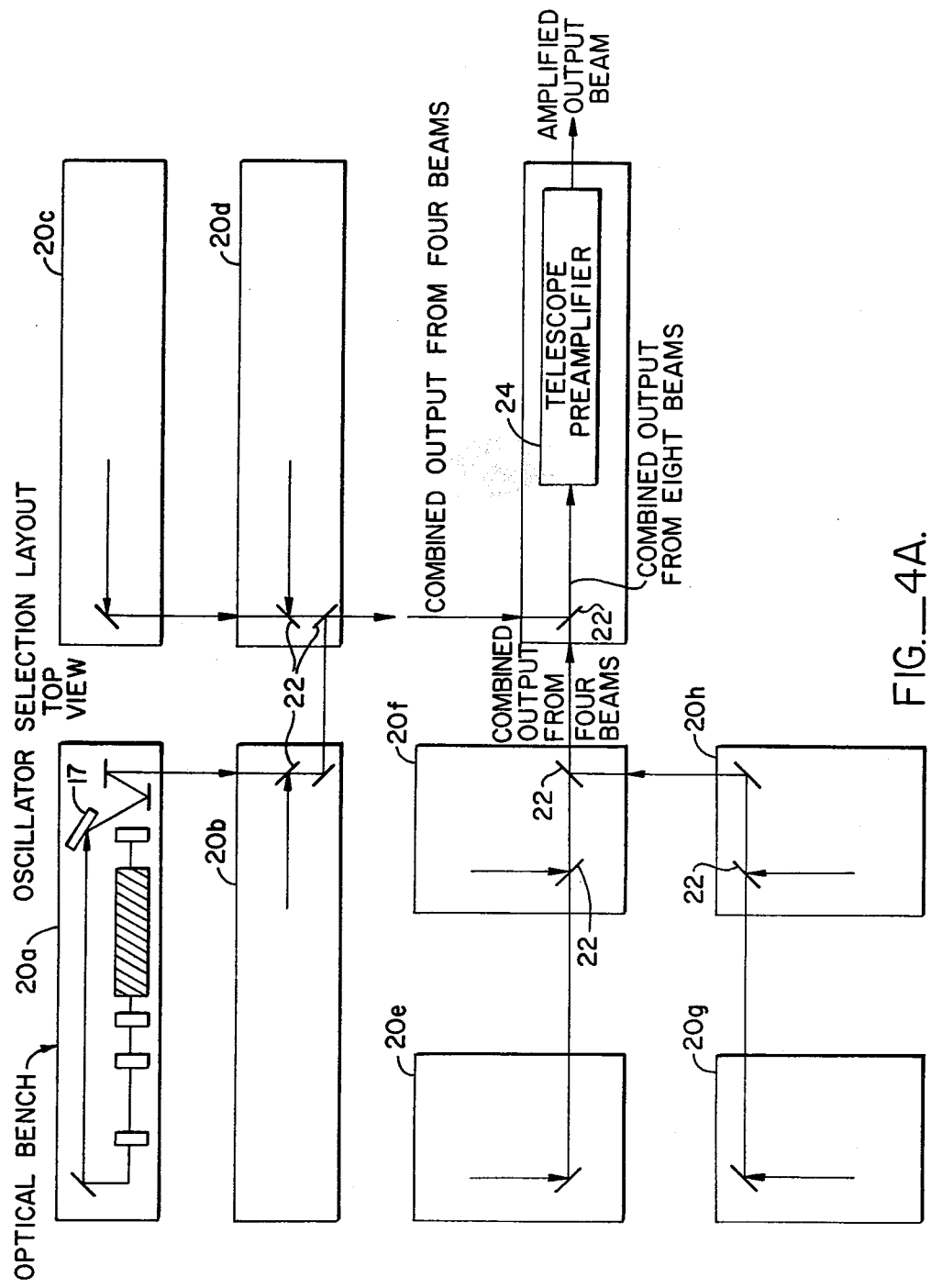
FIG._4A.

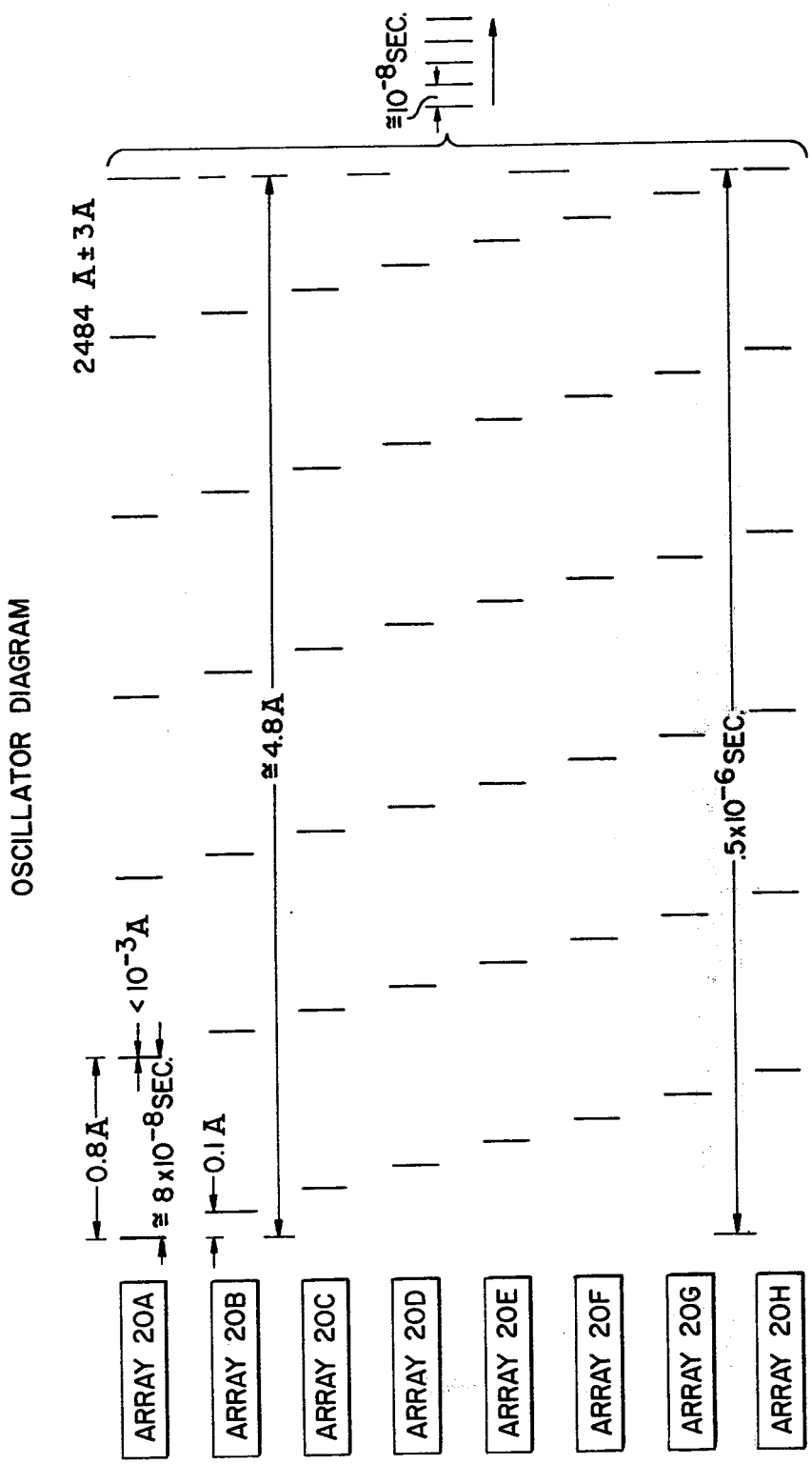
FIG._4B.

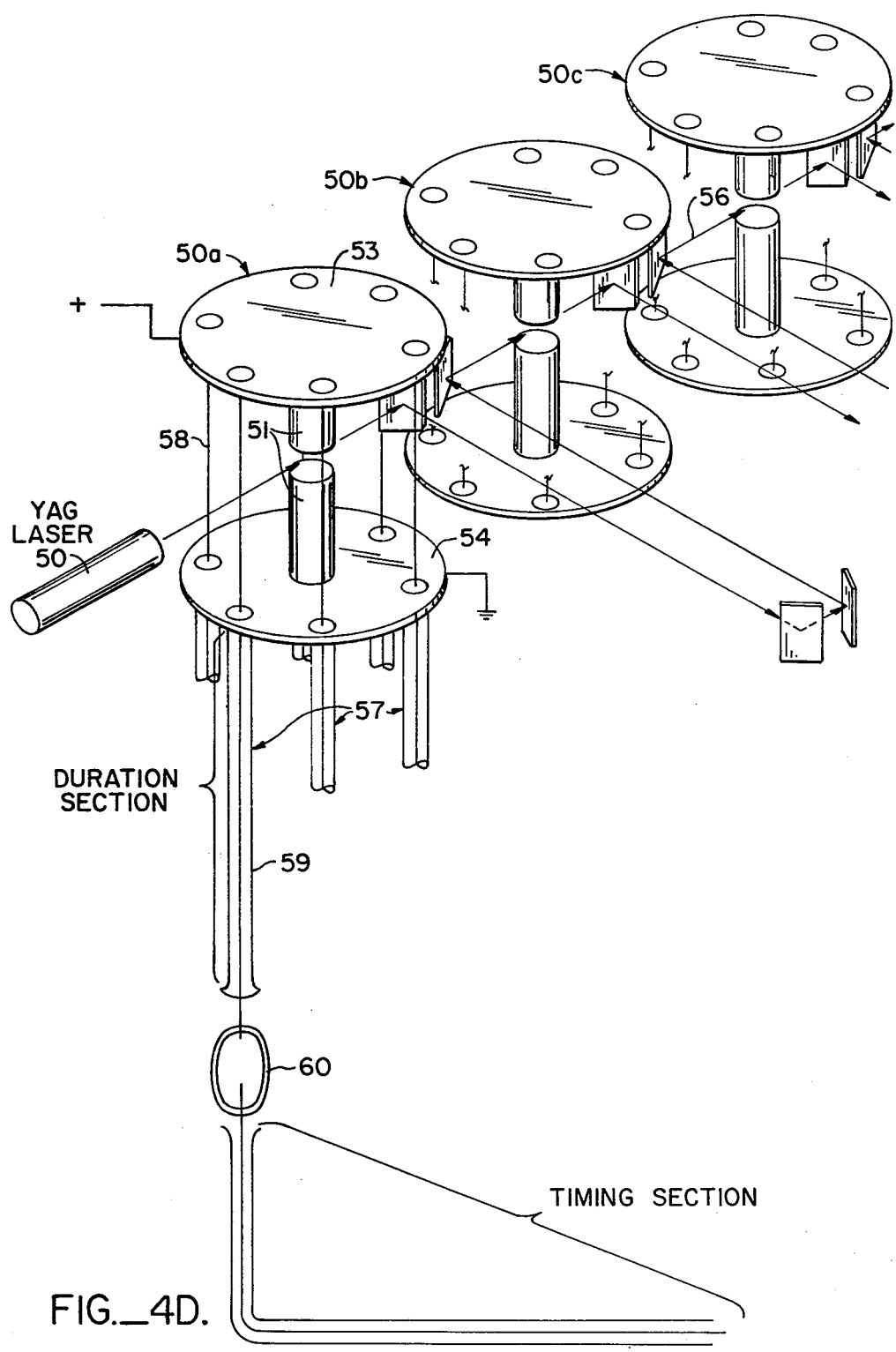
FIG._4D.

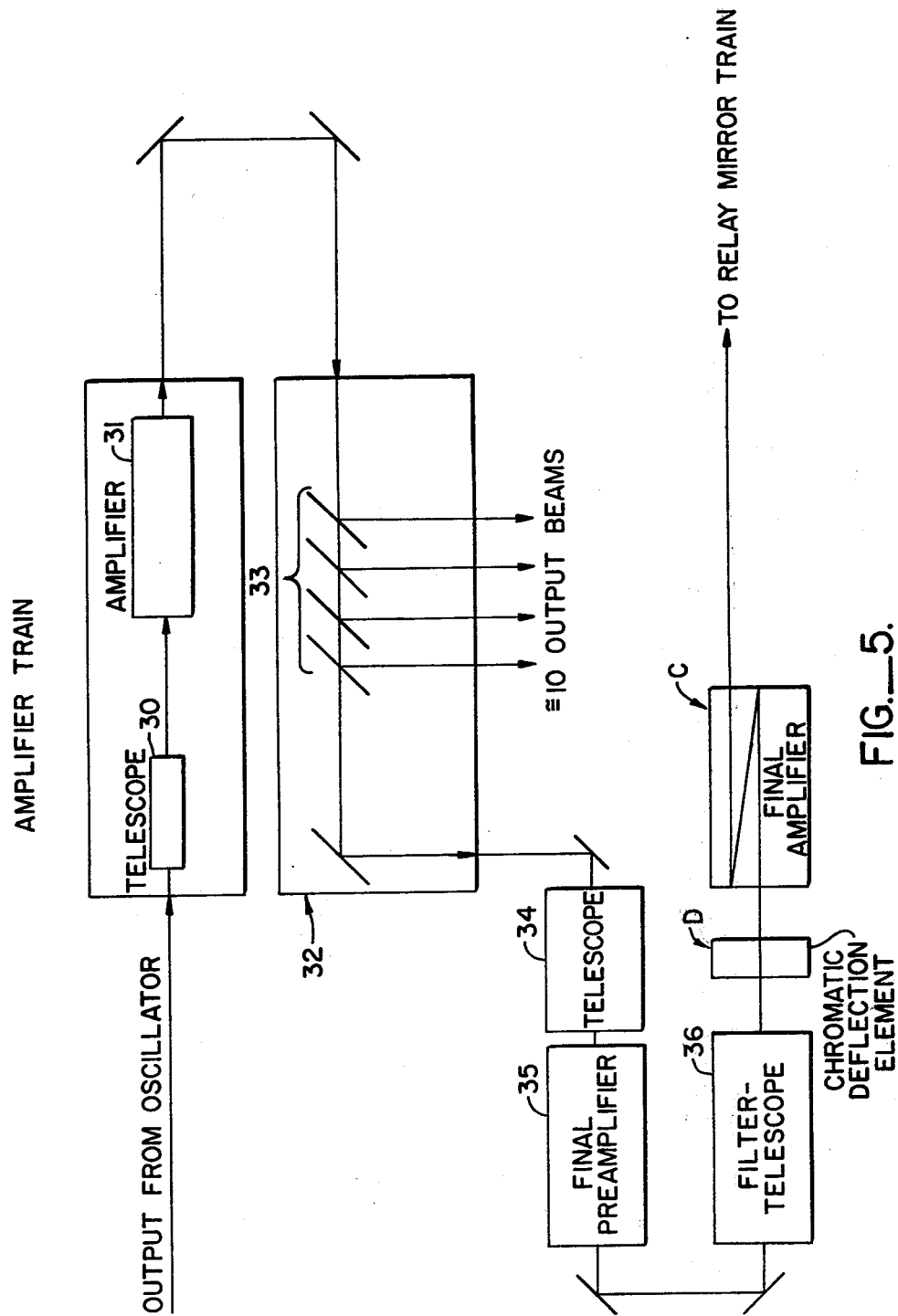

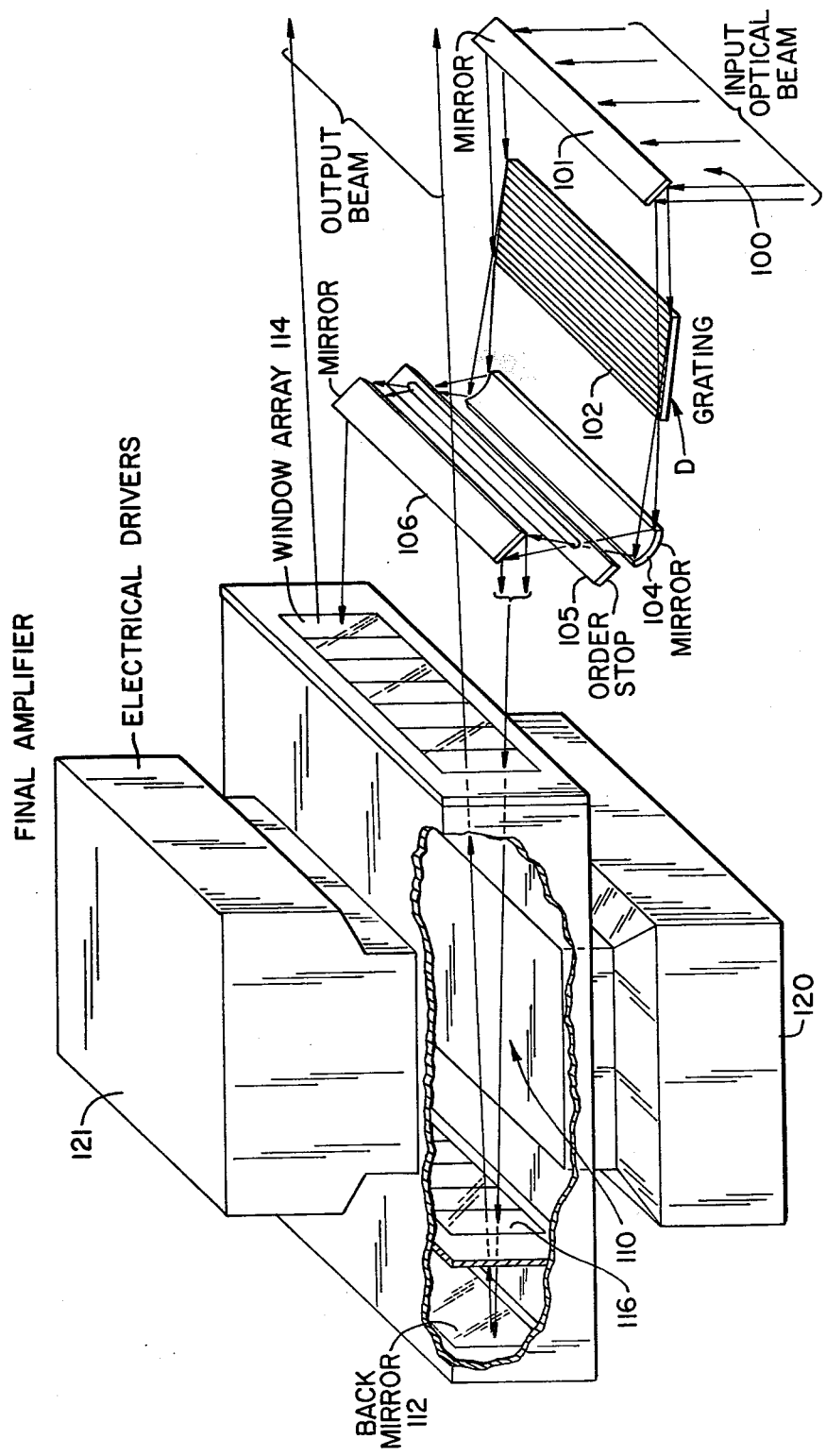
FIG._6A.

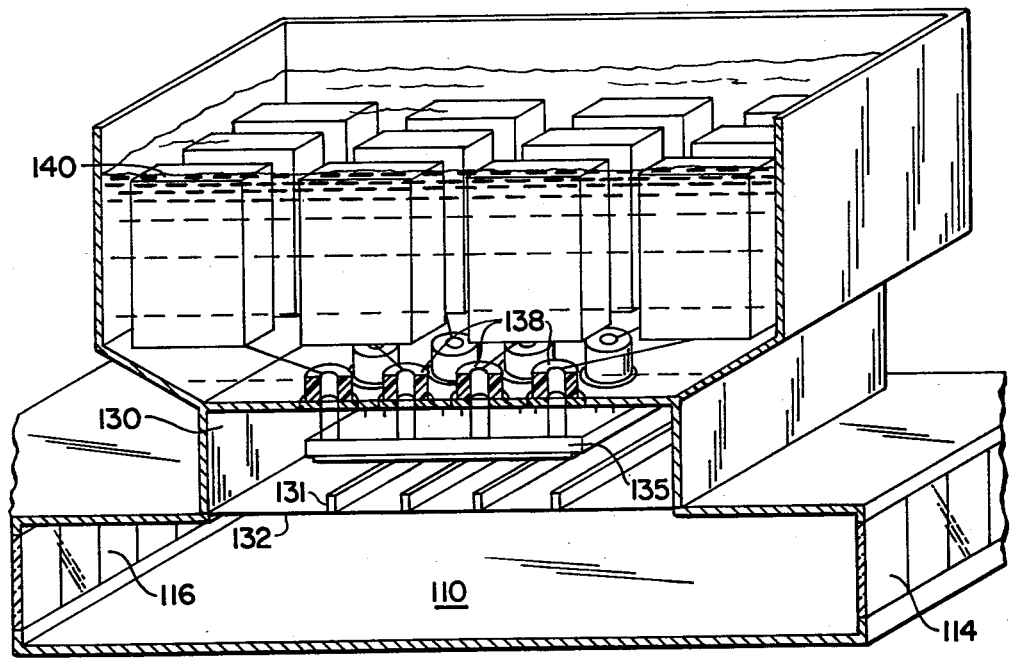
FIG._6B.
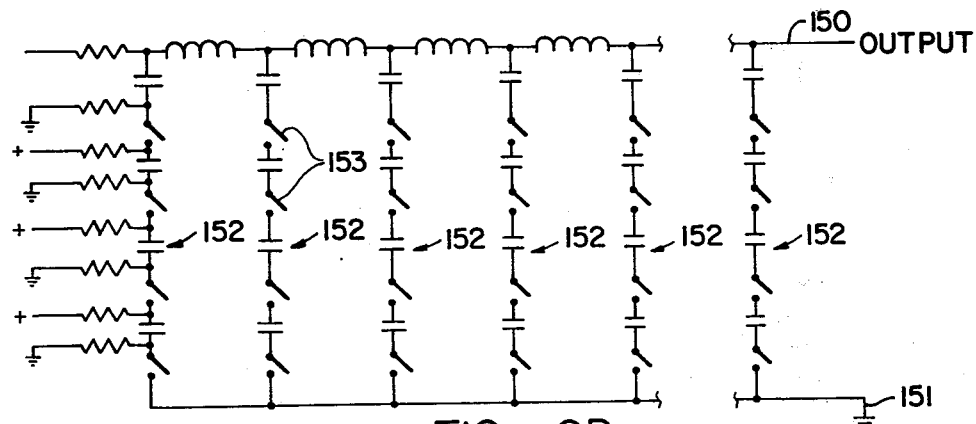
FIG._6D.
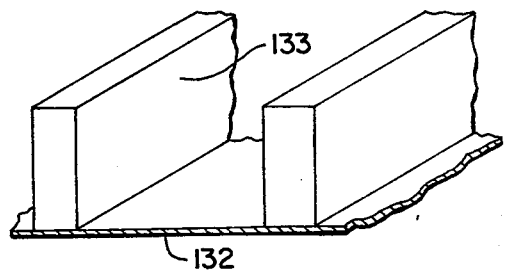
FIG._6C.
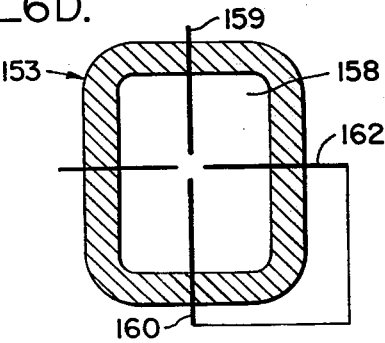
FIG._6E.

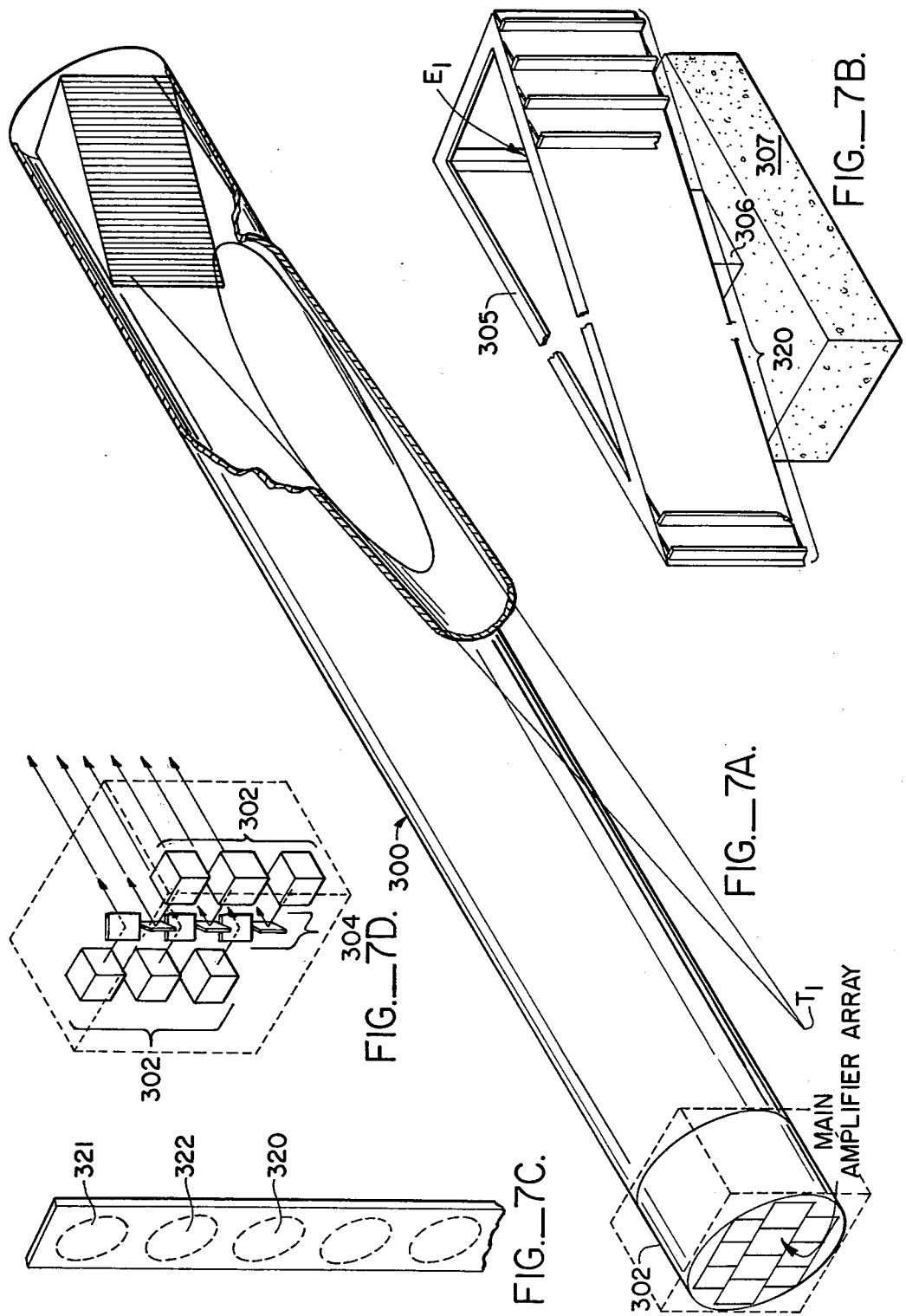

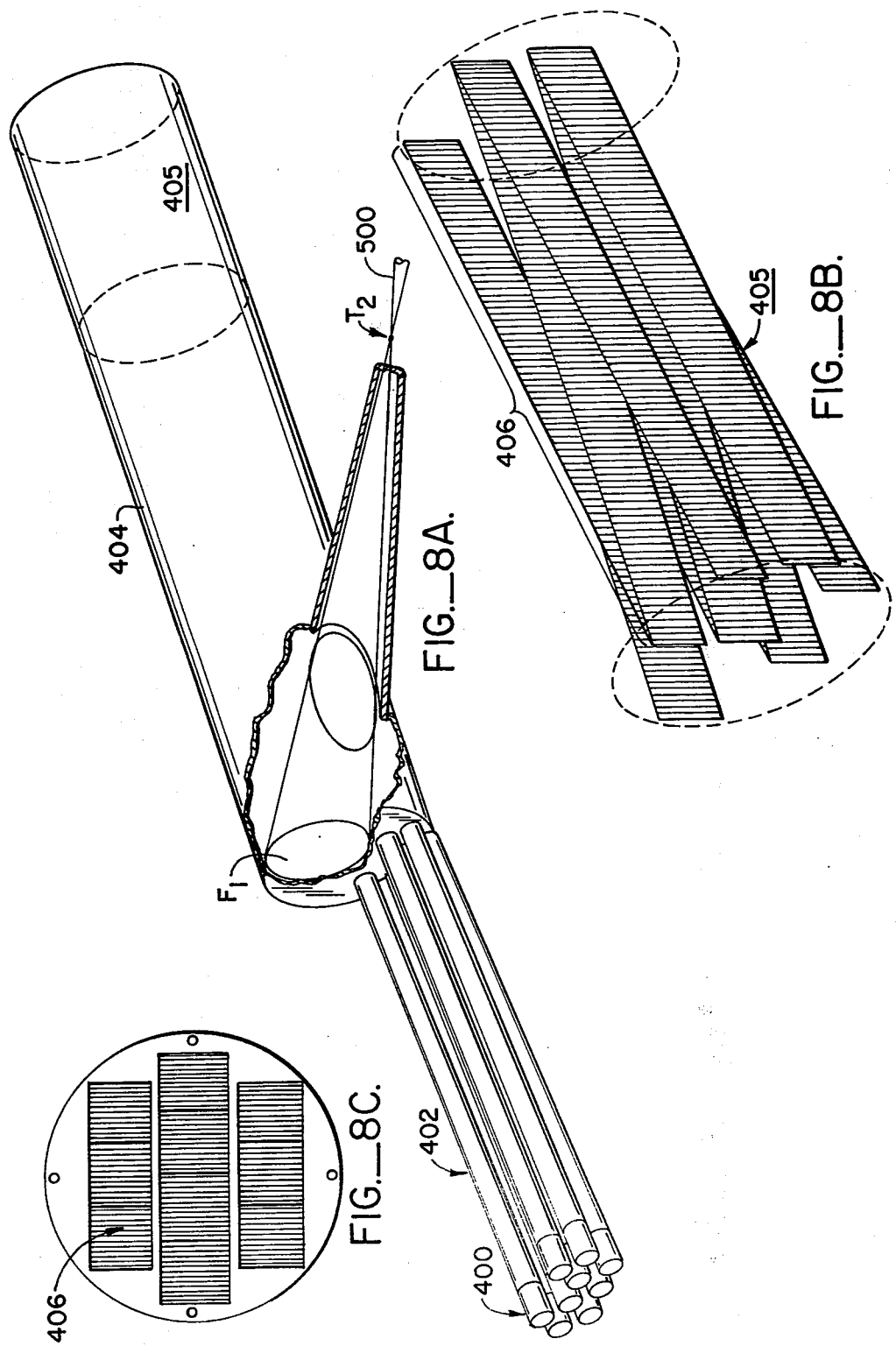

COMPRESSED PULSE LASER

This invention relates to lasers and particularly relates to a laser having addressed compensated optical paths wherein a series of temporally spaced pulses can arrive simultaneously at a target to generate high energy.

SUMMARY OF THE PRIOR ART

High energy lasers have heretofore relied upon discrete time-compensated optical paths for energy storage of lased light in transit. However, such lasers have required discrete multiangular optical paths through a laser amplifier. These discrete, multiangular paths have included separate inputs as well as separate outputs with the only path intersection occurring within the laser amplifier. The sheer geometry of mirrors and paths having differing angularities intersecting through a single laser amplifier has caused amplifiers with relatively low energy compression ratios.

In attempts to compress light paths of differing angularities passing through these same laser amplifiers, schemes of light frequency transducing have been necessary to provide the desired compression. However, such light transducing loses efficiency; relatively large amounts of energy in for corresponding energy out are required.

Krypton fluoride, the preferred lasing media herein, has heretofore been proposed as media for compressed pulse lasing. However, its efficiencies never have been fully realized because of the difficulties enumerated above.

SUMMARY OF THE INVENTIONS

A long pulse laser amplifier is sequentially lased over a 0.5 microsecond period by an additive group of temporally spaced discrete lasing colors (frequencies) each of slightly different color (approximately 1/10 of an Angstrom separation with less than a 1/1000 angstrom band width). An oscillator array generates the actuating pulses which are channelled to common optical path, amplified by a factor of $10^4$ and split up and shaped before injection into approximately 10 final amplifiers. Each final amplifier is preceded by a chromatic deflector, preferably a diffraction grating, so that each short pulse (in the order of about $10^{-8}$ seconds) is sent through the amplifier at slightly different directions. These differently directed pulses are amplified and individually address a mirror array placed at some distance away. Due to the narrow band width of each pulse, each address point is unique; there is no overlapping. As a result, the distance from each point on the mirror array may be to optically compensated for the difference in propagation time for each short pulse. By the expedient of sending the earlier pulses through longer paths and the later pulses through shorter paths, a mirror array can reflect to a spot of extreme small dimension with simultaneity of all pulses in time of arrival. By sequentially timing the pulses through each amplifier, large amounts of energy can be delivered to a spot of small dimension with a much shorter pulse length than that of the laser amplifier. Optionally, by phasing locking the discrete amplifier outputs together, large apparent apertures can be generated for either small target size or long path lengths. Phase locking can occur within given colors or all colors.

OTHER OBJECTS AND ADVANTAGES

An object of this invention is to adapt a rare gas halide laser to a high energy lasing mode. Rare gas halide lasers—especially krypton fluoride—can have inverted populations generated by electron bombardment techniques. During any time period greater than $10^{-9}$ seconds, the krypton fluoride will invert its population and become capable of lasing. By providing a series of pulses, all at greater intervals than $10^{-9}$ seconds, discrete color bands (in the order of $10^{-3}$ angstroms) will liberate energy contained within the gain profile of the inverted krypton fluoride population and lase in the 2484 angstrom range. I find that krypton fluoride is preferred as a lasing material becuase its transition line is homogeneous. Moreover, by maintaining a relatively narrow band width over the discrete color bands, it is possible to constructively interfere light at a target so that extreme high energy can be focused to a small unit area.

An object of this invention is to disclose a laser excited by temporally spaced, discrete color bands distributed over a narrow frequency differential (in the order of 5 angstroms). This laser utilizes the discrete colors by chromatic deflection (preferably a diffraction grating) to address a mirror array having compensated optical paths to provide for simultaneity of pulse arrival.

A surprising result is that by chromatically assigning angularity at the final laser amplifier, optical train geometric problems through the final lasing media are virtually eliminated. Moreover, each optical path can have its optical elements—especially mirrors—designed well within allowable energy fluence levels.

A further advantage of the disclosed invention is that energy compression on an array of such amplifiers can be generated up to a factor of 100. The system is capable of generating essentially large powers at extreme distances (in the order of a kilometer) to small spot sizes.

A further advantage is that the narrow band width separation between the most widely separated colors is such that constructive interference of light at a target is possible. High power outputs with low effective aperture targets are possible.

A further advantage is that an array of the laser amplifiers has a high conversion efficiency with power loss only in the range of 5-10%. By way of example, a $10^6$ joule power output with 3 pulses per second with each pulse length being in the range of $10^{-8}$ seconds with a power range of $2 \times 10^{14}$ watts is possible.

A further object of this invention is to disclose an oscillator array for a high energy laser. According to this aspect of the invention, a singular array of lasers having 0.8 angstrom band separations and timed outputs in the order of 80 nano seconds are addressed at chosen angular intervals to a chromatic deflection media (preferably a diffraction grating). Each of these elements (preferably eight) is angularly addressed with respect to the chromatic deflection media to provide a commonality of optical path output. By providing a group of such arrays channeling this pulse to a common path with pulse outputs timed to the order of ten nanosecond intervals, a laser amplifier exciting pulse may be generated. Amplifying with suitably placed laser amplifiers and shaping with telescopes, an oscillator with a common output optical path is provided having temporally spaced discrete color pulses.

An advantage of the oscillator of this invention is that by using a common optical path, path lengths can be maintained substantially identical in the oscillator section to provide the necessary constructively interfering output.

Additionally, a single optical path provides for ease of construction and similar ease of maintenance.

A further object of this invention is to disclose a high energy laser amplifier which can be particularly adapted to a high energy lasing system. Specifically, an electron bombarded krypton fluoride lasing and lasing media is maintained in an inverted state and sequentially lased by discrete pulses of light having pulse lengths in the range of 10 nanosecond intervals. A series of chromatically separate, discrete excitation light bands are impinged upon the lasing media; amplification in rapid sequence occurs. By passing either the light in or the light out through a chromatic deflection media (such as a prism or preferably diffraction grating) lased light passes through the system with discrete angular addresses from the amplifier.

An advantage of the amplifier is that the discrete angular addresses can all pass to separate optically compensated paths for simultaneity of arrival at a target. Energies can in effect be added and pulse compressed by a factor of 100. Moving parts are not required.

An advantage of this laser amplifier is that one high energy pulse can be lased from as many as 100 (and more typically 50) separate pulses. Each of these separate pulses are well within the energy fluence levels of conventional windows, deflection mediums and mirrors. High energy lasing can occur without being destructive of the optical train.

Another advantage is that since the laser amplifier is operated substantially continuously the gain is suppressed relative to a system that stores energy. This leads to ability to build larger volumes of lasing media with larger output.

Yet another object of this invention is to disclose a propagation array for a high energy output laser. Accordingly, a laser emitting temporally spaced discrete color bands addresses with differing angularities arrays of mirrors spaced at differing distances. The first pulse of a series from the laser is directed at a first angle along a long optical path to a first mirror; the second and later pulses are directed at second and different discrete angles along a shorter optical path to second and later mirrors. By focusing all mirrors to a common target and compensating the path length with each temporally spaced narrow and discrete color band, simultaneity of arrival of a constructively interfering light wave front at a target can occur.

An advantage of this propagation array is that designs can occur well within the limits of allowable optical train diffraction limits. Damage to the optical train can be avoided due to the low level of energy fluence for each optical path. Specifically, energy levels in the order one joule per centimeter squared or $10^4$ joules per meter squared can be used. Having final mirror arrays in the order of 100 square meters enables peak power delivery in the order of $10^6$ joules over a $10^{-8}$ second time frame with focus in the order of 25 microns.

According to one aspect of this invention, a plurality of, say, ten laser amplifiers addresses in sequence 48 mirror strips located along and within a vacuous conduit in the order of one kilometer in length. The mirrors in turn are focused to a common target and spatially varied from each amplifier in the order of 1.5 meters. The spatial variation in a retro-reflected optical paths such that simultaneity of pulse arrival at a target occurs.

Yet another aspect of this invention is to disclose for each discrete amplifier a corresponding and discrete mirror array. The light path from each amplifier to each mirror array can be at least in part a series of smaller vacuous conduits. Light reflected from the mirror arrays impinges upon focusing optics (typical a convergent mirror array) and thence to a target. By time compensating the optical paths, a Z-shaped lasing path is configured with simultaneous wave front arrival at a target.

The array is conveniently configured for opposition to another and similar lasing path. Pressures between constructively interfering and colliding wave front in the vicinity of stellar magnitudes are possible. Fusion pressures may possibly result.

Other objects, features and advantages of this invention will become more apparent after referring to the following specification and attached drawings in which:

FIG. 1 is a schematic diagram of the laser of this invention illustrating sequentially an oscillator, a typical primary amplifier and the optically compensated propagating path with simultaneous light pulse arrival at a target;

FIG. 2 is a typical gain profile of the rare halide gas krypton fluoride;

FIG. 3A is a typical oscillator laser array illustrating one laser with mirror, etalons and Pockels cells outputting to a diffraction grating to produce a multicolor temporally spaced array of pulses along a common output path;

FIG. 3B is a pulse diagram illustrating the relative pulse width and, pulse spacing of sequential pulses from the oscillator of this invention;

FIG. 4A is a schematic illustrating additives beam splitters for combining in a single output path a plurality—preferably 48—discrete color pulses from eight (8) laser arrays similar to those shown in FIG. 3A;

FIG. 4B is a timing and band width diagram for the oscillator;

FIG. 4C is a graphic array similar to FIG. 3B illustrating the final output of the oscillator array of this invention;

FIG. 4D is a perspective schematic of a timing system for sequencing the Pockels cells to generate outputs according to the limitations of FIG. 4C;

FIG. 5 is a schematic of the output of the oscillator passing through beam shaping telescopes and amplifiers illustrating with the particularity the passing of one beam of a split beam output array to a final amplifier;

FIG. 6A is a perspective view of one of the large lasing amplifiers of this invention;

FIG. 6B is a perspective and partially schematic view of a cold cathode electron emitter for inverting the population of krypton fluoride;

FIG. 6C is a detail of the emitter membrane;

FIG. 6D is a schematic showing one of the pulse forming networks for exciting the laser media; and FIG. 6E illustrates one of the command trigger mechanisms for actuating the pulse forming networks;

FIGS. 7A-7C are a series illustrating a series of amplifier arrays impinging upon an optically compensating mirror system for direction to a target;

FIGS. 8A-8C show an alternate optically compensated system of shorter length with addressing of the target in opposition to a similar opposed laser being partly shown.

Referring to FIG. 1, this invention is schematically illustrated. An oscillator A generates temporally spaced discrete lasing colors (frequencies). Each of these lasing colors is of a slightly different color (approximately 1/10 of an angstrom separating between discrete colors) and each color is essentially monochromatic having a discrete band width of less than 1/1,000 of an angstrom. All this will be more fully explained with reference to FIGS. 3A, 3B, 4A, 4B and 4C. Total frequency separation from the first emitted color to the last emmitted color is less than 5 angstroms.

The discrete pulses from the amplifier are timed or temporally spaced. Specifically, they are timed so that a complete sequence of colors is emitted within half of a microsecond. Each color is separated by a temporal interval in the order of 10 nanoseconds.

This array of temporally spaced discrete lasing colors is generated by a plurality of laser arrays, each array having six monochromatic lasers finely tuned. Each laser array emits color bands separated by 0.8 angstrom intervals at differing angularities to a chromatic deflecting element, such as a diffraction grating. The angularity of beam address and the chromatic deflecting element are all aligned so that a common optical path occurs from the output of oscillator A, through a preamplification and shaping section B at least to a primary amplifier C. Thus the primary amplifier is subjected to a sequence of stable single monochromatic bands of light at discrete timed intervals.

The preamplification and shaping section B is located along the common optical path (see FIG. 5). This section includes further laser amplification and terminates with beams splitter outputs along phase compensated optical paths to an array of final amplifiers such as that illustrated in FIGS. 6A, 6B, 6C, 6D and 6E.

In the amplifier section, overall energy efficiency of the device is realized, energy input in the oscillator, preamplification and shaping section being negligible. A krypton fluoride rare halide gas lasing media (preferably used throughout the invention in all lasers) is sequentially lased in discrete colors (i.e. frequencies) with tenth angstrom separation, 1/1,000 angstrom band width, and timed intervals in the order of 10 nanoseconds. The light through the amplifier, (preferably at the amplifier input) is channeled through a chromatic deflection element D such as a diffraction grating. This chromatic deflecting element imparts to the discrete bands of lased light specific angular addresses which then can be focused to a mirror array E.

Mirror array E includes two specific characteristics. First, each mirror of the mirror array is at an angular address relative to the primary amplifier C and the chromatic deflecting element D. These angular addresses are such that discrete band widths in the order of 1/1,000 angstrom address corresponding discrete mirrors.

Secondly, the mirrors are spaced at differing optical path lengths between a target T and mirror array E. The path lengths are chosen so that the first pulse emitted by an amplifier C has a long path and the second and later pulses have a short path. Path lengths are chosen so that target T has simultaneity of pulse arrival as well as constructive phase interference to generate a short ($10^{-8}$ second pulse) intense power ($2 \times 10^{12}$ watts) over an area in the order of 25 microns.

In reading the enclosed disclosure it will be understood that the optical train disclosed herein is designed for little scatter of the optical flux. Such scattering would destroy the spatio-temporal and discrete color array herein created. All lasing media is preferred to be krypton fluoride, a rare halide gas. This media is excited by electron bombardment. Methods of excitation are only described with respect to the large laser amplifiers illustrated in FIG. 6A through FIG. 6E, as ordinary excitation of this gas is within ordinary skill in the art.

Mirror, window, and chromatic deflecting elements sizing is performed primarily on the basis of allowable loading on the mirrors. Consequently the disclosed design is limited to a flux of 1 joule per centimeter square or $10^4$ joules per meter squared. This represents a very conservative loading of presently known optical elements by energy fluence.

As will hereinafter be set forth, so that the optical element loadings through the final amplifier chain may be at the level of several joules per centimeter squared, the present design has as the target mirror array a set of vertical mirror strips staggered over approximate 250 foot intervals. This is a difference in the optical path of 50 feet if the light is reflected near the incidence angle which corresponds to a 500 nanosecond electrical pulse. The area in the mirror arrays herein presented is about 10 meters squared and is shaped in a 10 meter by 10 meter square, whether utilizing the single mirror array of FIGS. 7A–7C or the discrete mirror array of FIGS. 8A, 8C.

All windows to the lasing elements are of high purity fused silica such as $MgF_2$, or $CaF_2$. The thickness to shortest unsupported length ratio is in the order of 0.03 to 0.1. Total window areas are in the order of 50 to 500 meters squared for the whole system. Overall figuring is in the order of 0.5 to 1 wavelength per window, if phase locking considerations are to be ignored. The windows are reinforced to withstand differential pressures of one atmosphere and are antireflection coated.

The illustrated mirrors in mirror arrays are either aluminized or preferably dielectrically coated. There are two types of mirrors. Mirrors up to the primary amplifier must withstand energy fluences of 1 to 10 joules per centimeter square for approximately half microsecond intervals at 3 per second loadings. Mirrors including the primary amplifier C and to target T are typically placed in a vacuum, inert gas or clean air atmosphere and have 1 to 5 joules per centimeter squared at $10^{-8}$ second intervals. Three regions for the optical path exist. First and up to the final amplifier, clean air or inert gas may be ued. Second, up to the point of substantial vergence to the target, inert gas or vacuum may be used. Thirdly, and thereafter, vacuum is required to the target.

Having set forth the general construction parameters of the optical train, attention can now be devoted to FIG. 2.

FIG. 2 illustrates a gain profile of krypton fluoride when lased in the region of 2484 angstroms. Specifically, a curve of intensity versus frequency for unresonated krypton fluoride is illustrated. For the purposes of my invention, the following characteristics of krypton fluoride are important and can be used in choosing alternate lasing mediums.

First, it will be noted that the gain profile is substantially homogeneous; it is distributed in a Gaussian type curve around a resonant frequency of 2,484 angstroms.

Secondly, and in a laser amplifier, lasing anywhere within the five angstrom range illustrated will liberate at the precise frequency of lasing the energy contained within the relevant inverted population of the krypton fluoride gas.

Thirdly, and assuming that a lasing media is excited by conventional electron bombardment, populations previously lased will re-invert for temporally spaced sequential lasings within a timed interval of approximately $10^{-9}$ seconds. For the purposes of my invention, this rapid characteristic re-inversion period of krypton fluoride enables sequential lasing at intervals of $10^{-8}$ seconds. These sequential lasings are necessary to utilize the optically compensated paths of this invention for simultaneous pulse arrival.

Moreover, it will be noted that all of the lased signals hereinafter utilized are each in the order of less than $10^{-3}$ angstroms band width and chromatically separated on the order of a tenth of an angstrom. Since it is characteristic of the krypton fluoride that it preserves relatively precisely the temporal and chromatic separations used to produce excitation, it is a uniquely suitable gas for the large capacity lasing disclosed in this invention.

Finally, it will be understood that constructive interference of simultaneously arriving wave lengths at the target is possible. This may be desirable both for producing a small aperture size as well as providing a high power level. By utilizing krypton fluoride over a range of less than 5 angstroms, in-phase constructive interference of light can be generated at a target T in the disclosed laser. The system will work without phase locking—but performance can be improved by using phase locking.

Referring to FIGS. 3A and 4A simultaneously, a laser array 20 is illustrated. Referring specifically to FIG. 3A, a conventionally excited krypton fluoride laser 10 is lased between paired mirror 11 and Pockels cells 12. Within the lasing paths there are placed conventional laser etalons 16 for restricting the lased frequency to band widths in the order of less than 1/1,000 of an angstrom. As will hereinafter be illustrated with respect to FIG. 4B, each laser 14 of each laser array 20 is precisely tuned by the inserted etalons to lase in the at less than a 1,000 angstrom band width at intervals in the order of 8/10 of an angstrom. Each laser 14 addresses a chromatic deflecting element D, here diffraction grating 17. Diffraction grating 17 utilizes the chromatic characteristic of each laser to address all outputs to common path out 19.

Pockels cells 12 are timed to sequentially trigger each laser over $10^{-8}$ second intervals; these intervals are precisely timed as illustrated in FIG. 4B and will hereinafter be more carefully set forth.

Krypton fluoride lasers suitable for use in the oscillators 10 are described in Applications of Rare Gas Halides and HF Laser Workshop of Sep. 19, 1978 published by Wally Schafer and Associates at pages MA 1-39.

Etalons 16 suitable for use in the invention are known and referenced in Applications of Rare Gas Halides and HF Laser Workshop of Sep. 19, 1978 published by Walley Schafer and Associates at pages MU 32-34.

Pockels cells 12 suitable for use with this invention are described in Optical Laser in Electronics by Earl L. Steele published by John Wiley and Sons, Inc. New York in 1968 at pages 51-72. See FIGS. 2-15 and substitute a Pockel Cell in conjunction with the illustrated Glan-Thompson prisms. Circuitry necessary for actuating the time intervals of the Pockels cells as set forth in the oscillator diagram of FIG. 4B are set forth in FIG. 4D and described hereafter.

The function of each laser in conjunction with the Pockels cells in known in the prior art and can be easily described. Specifically, one Glan-Thompson prism 12a is aligned to pass light of a first polarity and the second and remaining Glan-Thompson prism 12a is aligned to pass eight of a second and differing polarity. The Pockels cell 12 between the respective prisms is an energized polarity transducer. In the energized state, it transduces the light from the polarity of the first Glan-Thompson prism 12a to the polarity of the second Glan-Thompson prism 12a. Passage of light at the etalon selected discrete lasing frequency occurs.

Referring to FIG. 3A, it will be shown that only one laser 14 is illustrated. Each oscillator array includes six such lasers all eminating discrete colors (frequencies) at 8/10 of an angstrom separation. By addressing discrete lasers with 8/10 of an angstrom separation, a convenient and relatively wide angular spacing of each of the lasers relative to diffraction grating 17 can be provided. Convenient diffraction grating address is included to allow all of the tuned krypton fluoride lasers to have a common output optical path 19. An optical and/or order stop 18 in common output optical path 19 functions to assure monochromatic output of each laser in combination with diffraction grating 17.

It will be understood that each of the exciting lasers may be equipped with wave shaping lenses, additional chromatic stops and other common optics to provide the common path herein illustrated.

Referring to FIG. 3B an intensity versus angstrom separation plot is illustrated for a typical laser array such as the array shown in FIG. 3A. As can be seen, discrete pulses of band widths less than 1/1,000 of an angstrom are emitted at 8/10 of an angstrom interval. On a timing basis and referring to FIG. 4B discrete and sequential triggering of each of the lasers in its turn occurs in the order of $8 \times 10^{-8}$ seconds.

Referring to FIG. 4A, a group of arrays 20A through 20H are illustrated. By way of example, array 20A only illustrates one laser including the diffraction grating 17. From each such grating 17 on array 20A and all remaining arrays 20B through 20H, it will be understood that all arrays have common output paths. Commonality of output is provided by beam splitters generally denominated 22. As is well known to those skilled in the art, the beam splitters pass light slightly less than 50% of that originally fluent on the beam splitters 22. The output intensity of the arrays through the beam spitters 22 is adjusted so that the input to the preamplifier 24 from each discrete emitted pulse is of a substantially equal amplitude.

Understanding the array, attention can now be devoted to FIG. 4B. In FIG. 4B, each of the arrays 20A through 20H is illustrated on the left-hand side of the diagram. The laser oscillators are each separated around a 2484 angstrom band plus or minus 3 angstroms.

Turning the attention to the array 20A, it will be seen that pulses of less than a 1/1000 of an angstrom are emitted each separated by 8/10 of an angstrom of band spread. Typically, the pulses are emitted at timed intervals in the order of $8 \times 10^{-8}$ seconds.

It will be observed that the output of array 20A is staggered with respect to the output of array 20B. Specifically, each pulse of array 20B is staggered so that it is emitted at a time on the order of $10^{-8}$ seconds later than the corresponding pulse of array 20A. This same staggering is provided for arrays 20C through 20H.

Noting that there are eight arrays each with six discrete color outputs, it can be seen than a 0.5 microsecond output of the oscillator consists of 48 discrete colors, each separated by distance intervals in the order of $10^{-8}$ seconds. A total difference in color between the first emitted color of array 20A in the last emitted color of array 20H is in the order of 4.8 angstroms.

Those skilled in the art will respect that there are two limits to the timing output of each of the lasers of the oscillator. A first will be the switching action of the Pockels cell 12. The remaining limitation will be the pulse length of the active medium of laser 10 (or the approximate time an optical pulse exists for a high gain medium). The oscillator band width should be such that the switch time of the Pockels cell dominates the band width of the exit beam.

Moreover, and if phase locking is desired the path lengths from each laser of the oscillator A through and to the target T will be kept almost exactly the same. Where path length differs substantially, it becomes increasingly harder to match the phase at the target T to produce the desired constructive interference and apparent aperture effects necessary for high energy impact over a small target area.

Referring to FIG. 4D, timing of the individual Pockels cells in their firing to produce lasing according to the timing diagrams of FIG. 4B, 4C can be schematically understood. Specifically, a YAG laser lases through a sequence of switches 50A, 50B, 50C, etc. Each of these switches includes paired electrodes 51 and 52 contained in a high pressure nitrogen envelope (not shown).

Working of such switches is known. Specifically, YAG laser 50 is energized and passes light. When YAG laser is energized, conducting between the top portion 53 at an energized potential and bottom portion 54 at ground occurs.

Typically, the optical path 56 between all of the switches 50a, 50b, 50c can be folded. This folding is to make the path of light of laser 50 time-compensated so that switch 50a is closed in the desired firing sequence of laser array 20a, switch 50b is fired in the sequence of array 20b, etc.

Each of the switches 50a, 50b, etc. includes six discrete outputs. The function of only one of these outputs is illustrated.

As can be seen, single conductor 58 connects the energized portion 53 to a coaxial cable 59. Single conductor 58 becomes the inner and energized portion of the coaxial cable. The outer sheath of the coaxial cable 59 is connected to ground through bottom portion 54.

Output 57 is a discrete and chosen length. Specifically, it is sized so that the output pulse from switch 50A at each of the discrete outlets will be on the order of 10 nanoseconds.

Cable 57 outputs to a peaking circuit or gap 60. Peaking circuit or gap 60 assigns to the generated 10 nanosecond pulse a square wave shape. This abrupt square wave shape is utilized for abruptly turning on and off the respective Pockels cells 12.

It will be seen that with respect to FIG. 4D, all outputs of 50a will fire at the same time. Differential time of firing can be generated by having cables of differing lengths from the respective peaking circuits or gaps 60. Specifically, by sizing the length of cables in nanoseconds from each of the peaking circuits to the respective Pockels cells, differing timings for differing outputs can be generated.

It will be realized that the optical switches here shown can thus easily generate the timing more particularly set forth in the diagram of FIG. 4B. In actual practice, it may be desirable to have each of the respective switches 50a, 50b, etc. to have outputs to more than one array or less than one array of lasers, so long as the overall timing of the discrete colors remains in accordance with the diagram of FIG. 4B. Likewise it will be appreciated that other methods of generating timed pulses may be used.

Referring to FIG. 5, a common output from the oscillator is passed to a shaping telescope 30 and thence to a krypton fluoride laser amplifier 31. Telescope 30 shapes the temporally spaced discrete color sequence from the oscillator to the configuration of amplifier 31. Amplifier 31 is a conventional krypton fluoride laser sized and energized to enhance the intensity of the oscillator signal on the order of $10^4$.

The output from laser 31 then passes through an optical train to a beam splitter array 32. Beam splitter array 32 has on the order of ten output beams split off of the common optical path. Each output beam split off from the oscillator A is routed to a typical final amplifier C.

Each of the beam splitters 33 of beam splitter array 32 is designed to pass beams of substantially equal intensity to the respective final amplifier trains. Designs of such beam splitter arrays are well known to those skilled in the art and will not be repeated here. As a caution, however, it will be mentioned that each of the split paths should be preserved to be of substantially constant optical length. Those skilled in the art will realize that this is necessary so that simultaneous in-phase impact of optical energy occurs at target T.

Once the commonality of optical paths is broken at beam splitter 32, passage of exciting light occurs through a shaping telescope 34, a final laser preamplifier 35, and a filter telescope 36. Filter telescope 36 serves the dual function of beam shaping and preserving the system from aberration.

After departure from filter telescope 36, light enters into a chromatic deflection element A and into and through a final amplifier C.

It will be remembered that in FIG. 1, the primary amplifier C was illustrated optically upstream of the chromatic deflecting element B. In actual fact, it is preferred to have the chromatic deflection element B before final amplification. With this arrangement, the energy flux upon the final chromatic deflecting element D, typically a diffraction grating, is held at a minimum. Since it is a characteristic of amplifier lased light that focus is preserved during the amplification, assignment of the discrete angularity to each of the exiting chromatic bands before amplification is preferred.

Referring to FIG. 6A, an input optical beam 100 of essentially square configuration is deflected at a mirror 101 to chromatic deflecting element D here illustrated as grating 102. From grating 102 opposed concave cylindrical mirrors 104, 106 pass the incoming light of excitation through a lineal color or order stop 105 which provides a conventional linear stop transverse of the exiting light. Light then is passed through a lasing chamber 110 to a back mirror 112 and thence reflected through the lasing media and preferably out to a vacuous conduit (not shown in FIG. 6A). Light is angularly addressed to the propagating mirror array hereinafter illustrated.

Windows 114 and 116 provide optically transparent boundaries to the lasing media 110. Conventional walls are provided with opposed electron drivers 120, 121 exciting by electron bombardment. The krypton fluoride lasing media is typically maintained under a pressure in the range of one to three atmosphere.

Referring to FIG. 6B, the construction of one of the electron drivers 120, 121 is illustrated. Specifically, the krypton fluoride chamber 110 containing the lasing media and bounded by the windows 114, 116 has an overlying vacuum chamber 130. This vacuum chamber has a series of ribs 131 supporting a thin titanium membrane 132 in the order of one thousandths of an inch therebetween. A cold cathode emitter 135, preferably of carbon felt, is located within the vacuous chamber and connected by chamber lead-through 138 to a series of pulse forming networks 140. When the buses 138 charge the cold cathode emitter 135 for the release of an electron flow, the electrons pass through the sheet tungsten 132 as supported between bars 133 to invert the krypton fluoride lasing media.

The configuration of each of the pulse forming networks 140 can be understood with reference to the Marx generator schematically illustrated in FIG. 6D. Specifically, there is connected between an output 150 and ground 151 in parallel linear arrays of command switched capacitors 152. Specifically, each capacitor is capable of receiving an electron charge through discrete charging mechanisms. Command triggers 153 similar to that illustrated in FIG. 6E are placed between each capacitor.

Referring to FIG. 6E, chamber 158 filled with sulfur hexafluoride connects leads to paired capacitors 159, 160. By the expedient of altering a trigger potential on an intermediate electrode 162, a chain triggering and pulse forming action occurs. Line 150 when connected to the vacuum tight lead through 138 to the cold cathode emitter 135 produces a high energy electron flow through the lasing krypton fluoride in chamber 110. By causing the pulse of the pulse forming network to be liberated at the same time the krypton fluoride lasing media is lased. Output results.

Since the lasing media will be subjected to energizing pulses during at least the necessary $10^{-6}$ seconds time span, a single discharge of the energizing pulse at each major lasing amplifier is all that is required to produce the high energy pulse of this invention.

Regarding the dimension of all lasers used herein, lasing chambers in the order of one to ten feet of length have been found by me to be advantageous. With respect to the final laser amplifier shown, the active media is roughly a box having dimensions of three meters in length, three to four meters in height, and one meter in depth. This provides the optimum dimension of the inverted krypton fluoride suitable for lasing.

Understanding that the laser amplifier illustrated in FIGS. 6A-6E emits energy chromatically addressed in accordance with a band width separation produced in the original oscillator, discussion of two propagating paths environments can be made. One propagating path being shown in FIGS. 7A-7C; a second propagating path being shown in FIGS. 8A-8C.

Referring to FIG. 7A, a vacuous chamber 300 having a light path in the order of one kilometer in length is illustrated. In order to provide minimal interference to light energy in transit, vacuums in the order of $10^{-6}$ to $10^{-2}$ torr are provided. As illustrated at 302 in FIG. 7A, an array of ten final amplifiers addresses along the one kilometer length path 300. Path 300 includes a ten meter square of cross-sectional area to a triangular mirror array $E^1$ at the end of the chamber.

Referring to FIG. 7B, typically an array of plurality of main amplifiers C such as those illustrated with respect to FIGS. 6 address a series of angulated mirrors 304. These mirrors in turn each pass light in stacked lineal rays so that impingement of each color occurs on each mirror strip as illustrated in FIGS. 7B, 7C.

Referring to FIG. 7B, mirror array $E^1$ is fastened to a rigid optical mount 305 which in turn is supported through a foundation 306 to an anchor 307 here schematically shown as a large block. If phase locking is desired, each mirror is mounted to frame 305 by piezoelectric mountings so that it may be individually dithered to accquire the desired phase and optical path lengths to the target $T^1$.

Referring back to the timing diagram of FIG. 4B, it will be remembered that the pulses were separated by timed intervals in the order of $10^{-8}$ seconds. Therefore, and in order to assure simultaneity of pulse arrival at target T, the first emitted pulse from each of the main amplifier arrays of array 302 should travel along an optical path that is in the order of 140 meters longer than the last emitted pulse. Assuming an array of 48 such mirrors (and remembering that FIG. 7B is only schematic as to the number of mirrors) the lineal distance variation of the mirrors will be in the order of one hundred meters (more precisely seventy-two meters) for the illustrated mirrors.

Referring briefly to FIG. 7C, a discrete mirror 320 is illustrated. The mirror 320 receives along its length discrete pulses from each of the amplifiers. These pulses are received at discrete, different and descending areas 321, 322, etc. along the length of the mirrors. Each of the mirrors 320 is focused so that light proceeding from the mirror array may then impinge on the target $T^1$.

It should be understood that my invention includes a rather surprising result. Specifically, energy is in effect stored by light in transmit within conduit 300. As I have heretofore set forth, this storage of energy and light in transit at no place over-stresses optical elements along the optic path. Instead, all optical elements through and including mirror array $E^1$ are maintained essentially well within allowable fluence limits. Thus, the laser of this invention can lase at designed energy levels without substantial wear on the illustrated optical train.

From the mirror assembly $E^1$, each of the mirror strips 320 focuses the light to converge upon the target $T^1$. Such convergence that takes place along an essentially conical vacuous target path. As can be readily understood by those having ordinary skill in the art, a similar laser could provide opposition in a mirror configuration to target $T^1$ by actuating both lasers with the described simultaneity herein. Energy levels in the order of those theoretically required for fusion can be generated.

Referring to FIGS. 8A-8C, an alternate embodiment of the propagating array of this invention can be illustrated. An array of laser amplifiers similar to that single amplifier illustrated with respect to FIGS. 6A-6E is shown at 400. Each of these amplifiers addresses its own discrete vacuous conduit 402 to a main vacuous chamber 404. Chamber 404 includes at one end thereof arrays of discrete mirror strips, one such mirror array being intended for each of the ten amplifiers of array 400. Each mirror strip of each array is similar to, out smaller in dimension than, that mirror illustrated in FIG. 7C and only here schematically shown.

Vacuous conduit 404 includes at the end thereof a mirror array 405. This mirror array is specifically illustrated in schematic perspective in FIG. 8B and shown in front elevation in FIG. 8C. Necessary optical benchwork and piezoelectric electric mountings of each mirror for required dithering is omitted.

Referring to FIG. 8B it will be noted that array 406 when addressed from the amplifier appears as an essentially square strip of mirrors. When viewed in the perspective of FIG. 8B, it will be seen that the mirror array includes a time compensated series of paths suitable for imparting to the sequentially emitted lased beams simultaneity of beam arrival at the illustrated target $T^2$ (see FIG. 8A). It will be understood that the angularity of each discrete vacuous conduit 402 from its respective main amplifier is addressed so that the lased energy will be incident upon that particular amplifiers own mirror array.

It will be appreciated by those skilled in the optic art that beams of differing path length require differing focus as they are emitted from the laser amplifier. As this differing focus is required, one of two expedients may be used. A chromatic compensating element for variable length may be inserted to or configured within the optic elements through which the lased beam of energy from each amplifier. This will impart to the discrete colors discrete complimentary focal lengths so that each path may be simultaneously compensated. Alternately, each path may be independently compensated. For example, each of the mirrors of array 406 could be figured to provide optimal focus at target T1.

The array of mirrors illustrated in FIG. 8C has the additional advantage in that it creates an overall system aperture of a relatively large diameter. This enables either the path length to be substantially reduced or the aperture of beam impingement to be maintained of a small size over a long length conduit. In either case high energy fluence is possible at target T2.

In the embodiment shown in FIG. 8A, light from each discrete mirror array 406 is then impinged upon relay and focusing optics F1. These optics may take any configuration desired, including a concave mirror of essentially parabolic figure and figured for off axis focus to target T2. It will be remembered that focusing optics F1 should have a dimension substantially the same as the mirror array 405 so that allowable optical train energy fluence levels are not exceeded.

Once reflected from optics F1, the energy is converged to and towards target T2.

It should be realized that the disclosed optical system is ideally configured for opposition to a mirror image system. This has been partially illustrated at 500 in FIG. 8A.

It will be understood that the teaching of this application contains the overall blueprint for the construction of an extremely large type energy laser, compressing a series of pulses from a krypton fluoride rare halide gas laser. The disclosed system has the advantage of utilizing technology existent as of the date hereof and only requires application of resources and energy within ordinary skill in the art to achieve the high energy lasing set forth herein.

I claim:

1. A laser amplifier for lasing temporally spaced discrete lasing colors from an oscillator, said laser amplifier comprising: a common input path for inputting said temporally spaced discrete lasing colors; chromatic deflection means for assigning to discrete lasing colors discrete angularity along a plurality of output paths located at the input to said laser amplifier media for amplifying said light after said lasing media has assigned discrete angularity to each of said temporally spaced discrete lasing colors; and a laser said chromatic deflection means having discrete angular address through said lasing media to output paths en route to a target.

2. The invention of claim 1 and including a color stop in said optical path downstream of said chromatic deflection means.

3. The invention of claim 1 and wherein said laser amplifier utilizes krypton fluoride excited by electron bombardment.

4. The invention of claim 1 and wherein said optical paths en route to a target are time compensated with optical paths having long path lengths for the first of said lased discrete colors and short paths for the later of said lased discrete colors.

5. The invention of claim 1 and wherein said chromatic deflection means includes a diffraction grating.

6. The invention of claim 1 and wherein said laser amplifier includes a reflected path through the lasing media of said amplifier.

7. The invention of claim 1 and wherein each of said time compensation optical paths includes a discrete mirror for reflecting light and the path lengths of said time compensation optical paths are varied by variable spacing of said mirror from said laser amplifier.

8. The invention of claim 1 and including a plurality of laser amplifiers; and a plurality of mirrors with each mirror alligned to receive from each of said plurality of said amplifiers temporally spaced lased discrete colors.

9. An oscillator and laser comprising: at least one array of monochromatic lasers each with a discrete lasing color; chromatic deflection means having discrete angular address from each of said lasers of said array of lasers; a common output path from said chromatic deflection means; each said laser of said array of monochromatic lasers angularly aligned to said chromatic deflection means to assign to light from each said laser a common output path; means for temporally spacing the output of each laser to provide to said common output paths a group of discrete temporally spaced lasing colors; at least one laser amplifier aligned to said common optical output; and, chromatic deflection means aligned to said common output immediately before said laser amplifier to assign discrete angularity to discrete colors through said laser amplifier.

10. The invention of claim 9 and including a plurality of arrays of monochromatic lasers, each laser of all of said arrays of monochromatic lasers having its own discrete lasing color.

11. The invention of claim 9 and wherein all said lasers are rare gas halides.

12. The invention of claim 9 and wherein said discrete lasing colors have band widths in the order of one-thousandths of an angstrom and each said discrete lasing color is separated from the remaining lasing color in the order of one-tenth of an angstrom of frequency differential.

13. An oscillator and laser comprising: an array of monochromatic lasers each with a discrete lasing color; first chromatic deflection means having discrete angular address from each of said lasers of said array of monochromatic lasers; a common output path from said chromatic deflection means; each of said monochromatic lasers angularly aligned with respect to said chromatic deflection means to assign to light from each of said monochromatic lasers a common optical output; means for temporally spacing the output of each laser to provide to said common output paths a group of discrete temporally spaced lasing colors; at least one laser amplifier aligned to said common optical output; second chromatic deflection means aligned to said common path at the input to said laser amplifier to assign discrete angularity to discrete colors; a plurality of time compensated optical paths having longer path lengths for the first of said lased discrete colors and shorter path lengths for the later of said discrete lased colors; and a target with respect to said compensated paths to permit simultaneity of arrival of said sequentially lased colors at said target.

14. The invention of claim 13 and including a color stop downstream of said first chromatic reflection means.

15. The invention of claim 13 and including a color stop downstream of said second chromatic deflection means.

16. The invention of claim 13 and including a plurality of laser amplifiers.

17. The invention of claim 16 wherein separate time compensated optical paths with separate mirrors are provided for each laser amplifier.

18. A process of lasing a series of discrete colors for simultaneous impact to a target comprising the steps of: providing a plurality of lasers, each laser lasing a discrete monochromatic frequency; lasing each of said lasers at discrete time intervals; aligning said lasers for output to a common optical path; providing a laser amplifier in said common optical path; chromatically deflecting each discrete color at the entrance to said laser amplifier to singular optical paths for each color and providing time compensated optical paths, one for each singular path with the first admitted colors having longer path lengths, the second and later admitted colors having shorter path lengths; and providing a target spaced with respect to said compensated paths to permit simultaneity of arrival of sequentially lased colors at said target.

19. The process of claim 18 and wherein said aligning step includes providing beam splitters for each of said lasers, and aligning said beam splitters for output to a common optical path.

20. The invention of claim 18 and including phase locking at least some of discrete colors for constructive interference at said target.

* * * * *